United States Patent Office 2,833,732
Patented May 6, 1958

2,833,732

METHOD OF PREPARING SILOXANE RESIN FOAMS

Donald E. Weyer, Midland, Mich., assignor to Dow Corning Corporation, Midland, Mich., a corporation of Michigan No Drawing. Application August 25, 1954
Serial No. 452,215

4 Claims. (Cl. 260—2.5)

This invention relates to a method of preparing structural and insulating foams which employs an organosilicon foaming agent.

Foams both from organic and organosilicon resins have been known and employed in commerce. These materials are used for thermal insulation and for reinforcing of structural members. The primary advantage of the foams lies in the fact that they give reinforcement with a minimum of weight. This is of particular importance in the aircraft industry.

Organosilicon structural foams are disclosed in U. S. Patent 2,655,485. Foams which are prepared by the method claimed in that patent have proven to be satisfactory for many uses. However, the friability of these foams is disadvantageous in many uses. Consequently, it would be desirable to produce an organopolysiloxane foam in which the friability of the foamed product is substantially reduced.

It is an object of this invention to provide a novel method for preparing resin foams suitable for use as thermal insulation and for reinforcing structural members. Another object is to provide siloxane resin foams of improved toughness and of finer pore structure. Another object is to provide organopolysiloxane foams having a lower density than has heretofore been obtainable. Other objects and advantages will be apparent from the following description.

The term "resin" as employed herein includes any organic or organosilicon material which is capable of polymerizing to form a noncollapsing structure. The term includes both elastomeric and nonelastomeric materials.

In accordance with this invention a foam is prepared by heating a mixture of (1) a resin selected from the group consisting of organic resins and organosilicon resins of the formula $$R_n SiO_{\frac{4-n}{2}}$$

where R is a monovalent hydrocarbon radical or a halogenated monovalent hydrocarbon radical and $n$ has an average value from 1 to 2 inclusive; (2) from .05 to 50% by weight based on the weight of the resin of an organosiloxane in which at least a major portion of the silicon atoms have at least one hydrogen atom attached thereto and (3) a hydroxylated compound, at a temperature sufficient to give a resin foam.

The resins (1) which are operative in this invention include any organic resin such as for example alkyd resins; isocyanate resins; vinylic resins such as polyvinylchloride, polyvinylacetate, polyvinylbutyral, polymethylacrylate, polymethylmethacrylate, polystyrene, polyvinylcarbazole, polyisoprene, copolymers of styrene and butadiene and coumarone-indene resins; polyamide resins; polyester resins; phenol-formaldehyde resins; urea-formaldehyde resins; melamine-formaldehyde resins; furane resins; and copolymers thereof.

Resin (1) can also be any organopolysiloxane of the formula

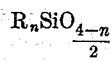

in which R is any monovalent hydrocarbon radical such as alkyl radicals such as methyl, ethyl, propyl, butyl, and octadecyl; alkenyl radicals such as vinyl, allyl and octadecenyl; cycloaliphatic radicals such as cyclohexyl and cyclohexenyl; aryl hydrocarbon radicals such as phenyl, tolyl, and xenyl; and aralkyl hydrocarbon radicals such as benzyl. R can also be any halogenated monovalent hydrocarbon radical such as trifluorovinyl,

dichlorophenyl, dibromoxenyl, pentafluoroethyl, and chlorodifluorovinyl. For the purpose of this invention the ratio of the average number of organic groups to silicon in the organosiloxane should range from 1 to 2. Thus, these siloxanes are primarily composed of units having 1 and/or 2 organic radicals on each silicon. However, the resins may contain limited amounts of triorganosiloxane units and $SiO_2$ units.

The hydrogen containing organosilicon compound (2) must be employed in amounts between .05 and 50% by weight based on the weight of resin (1). When (2) is employed in amounts above 50% by weight or amounts below .05% by weight, satisfactory foams are not obtained. In fact often no foams at all are obtained. Hydrogen containing organosiloxanes (2) which are operative in this invention are materials of the unit formula

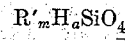

in which R' is of the group lower alkyl radicals and monocyclic aryl hydrocarbon radicals, and $m$ and $a$ both have average values from 1 to 2 inclusive, the sum of $m+a$ being not greater than 3. Thus specific examples of a hydrogen containing siloxanes which are operative herein are methyl hydrogen siloxane, ethyl hydrogen siloxane, butyl hydrogen siloxane, phenyl hydrogen siloxane, tolyl hydrogen siloxane, methyl di-hydrogen siloxane, diphenyl hydrogen siloxane and phenylmethyl hydrogen siloxane. Preferably the alkyl radicals should contain less than 5 carbon atoms.

In addition the siloxane (2) can be copolymers of the above defined hydrogen containing siloxanes and monovalent hydrocarbon substituted and halogenated monovalent hydrocarbon substituted siloxanes. In such cases, however, at least 50% of the silicon atoms in the copolymer should contain at least 1 hydrogen atom attached thereto. Specific examples of such copolymers are copolymers of trimethylsiloxane and methyl hydrogen siloxane, copolymers of dimethylsiloxane and methyl hydrogen siloxane, copolymers of chlorophenylmethyl siloxane and phenyl hydrogen siloxane, copolymers of dimethyl hydrogen siloxane and methyl hydrogen siloxane, and copolymers of trimethylsiloxane, tolyl hydrogen siloxane, and dimethylsiloxane.

The hydroxylated compound (3) which is employed in this invention can be any compound having a hydroxyl group therein. Preferably the compound should be neu-

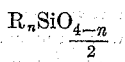

tral. Specific examples of hydroxylated compounds which are operative herein are carboxylic acids; alcohols such as ethanol, methanol, butanol, glycerine, ethylene glycol, ethylene glycol monomethyl ether and polyethylene glycol; silanols such as diphenylsilanediol, hydroxylated siloxane resins, dimethylsiloxanediols of the formula

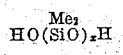

in which $x$ is an integer; and water. If resin (1) contains hydroxyl groups in amount more than .05% by weight, then it will serve as the hydroxylated compound (3). Thus, for example, in foaming an alkyd resin which contains unreacted glyceryl hydroxyls it is not necessary to put in additional hydroxyl compounds in order to produce foaming. By the same token, if a hydroxylated polysiloxane resin is employed as (1) it is not necessary to add additional hydroxyl compound in order to produce a foam. On the other hand, if resin (1) is substantially hydroxyl free, that is, contains less than .05% by weight hydroxyl then an additional hydroxyl compound (3) is usually required.

The number of hydroxyl groups to be added to the system relative to the amount of hydrogen containing siloxane (2) is not critical provided enough hydroxyl groups are present to cause the evolution of sufficient hydrogen to produce the desired foam. It is believed that the foam is produced by the reaction

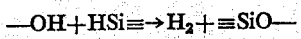

Ideally the number of hydroxyls in the system should be sufficient to react with all of the silicon hydrogens. However, if desired, the number of OH can be less than or in excess of the number of SiH.

The amount of compound (2) relative to resin (1) is varied depending upon the density of the foam required. The more hydrogen that is evolved per unit weight of resin (1) the lighter will be the foam. The less hydrogen evolved, the more dense will be the foam. Thus, the smaller the amount of compound (2) employed the denser will be the foam.

The ingredients may be mixed by any suitable means such as by stirring, milling and dissolving in a common solvent. It is best to remove any solvent prior to foaming. After the ingredients are mixed, the material is caused to foam by heating at a temperature sufficient to produce evolution of hydrogen and curing of the resin. In general the temperatures employed range from 30° C. up to 200° C. although temperatures in excess of this may be employed if desired.

If the resin is a thermoplastic material, the resin should be cooled immediately after foaming in order to prevent collapse of the foam. If the resin is a thermosetting material, the temperature of foaming and after cure should be such that the resin will set before it collapses. The precise temperature, of course, will vary depending upon the type resin being foamed and upon the particular catalyst, if any, which is being employed to set the resin.

If desired, catalysts may be employed in the method of this invention in order to speed up the reaction between the silicon hydrogen and the hydroxyl groups and also to cure the resin which has been foamed. Suitable catalysts which may be employed if desired are amines; salts of carboxylic acids, such as lead octoate, dibutyl-tin-diacetate, dibutyl-tin-dilaurate, and potassium acetate; organic peroxides; salts of dithiocarbamate acids and sulfur.

The process of this invention is particularly adapted for the production of improved organosiloxane resin foams. The preferred foaming agent is methyl hydrogen polysiloxane. Foams obtained when this material is employed show properties which are superior to those obtained from any other foaming agent. These foams are characterized by excellent uniformity of pore structure and finer pore size and toughness than is shown by any other heretofore produced organopolysiloxane foam.

In mixing the compositions of this invention care should be taken that the mixing be carried out at the lowest possible temperature in order to prevent premature foaming. In general, resin (1) if it is not already fluid at room temperature, is heated to above its melting point and the hydroxylated compound and hydrogen containing siloxane are thoroughly mixed in. If the material is to be foamed immediately, the temperature can then be elevated sufficiently to produce rapid foaming. If, however, the material is to be stored and foamed later, the mixture should be immediately cooled after mixing is complete. The solidified material can then be ground into a powder and stored for future use. In many applications it is preferable to use a powder since it is easier to handle such a material particularly where it is necessary to fill elongated structural members. The use of a powder allows the foam composition to be poured into the member without forming large pockets of entrapped air. The material can then be heated above foaming temperature whereupon it will foam in place.

If desired, fillers may be incorporated in the foams of this invention along with any desired pigments, oxidation inhibitors and the like which are normally employed in foam compositions.

The following examples are illustrative only and are not to be construed as limiting the invention which is properly defined in the appended claims.

*Example 1*

300 g. of a hydroxylated siloxane resin having the composition 29.4 mol percent phenylmethylsiloxane, 32 mol percent monomethylsiloxane, 32.6 mol percent monophenylsiloxane and 6 mol percent diphenylsiloxane which contained 5% by weight silicon bonded hydroxyl groups, was mixed with 2 cc. of a fluid trimethylsilyl end-blocked phenyl hydrogen polysiloxane and 2 cc. of dibutyl-tin-dilaurate. The mixture was then heated to 120° C. whereupon uniform foam was produced.

*Example 2*

300 g. of a hydroxylated polysiloxane having the composition 29.1 mol percent monophenylsiloxane, 61.8 mol percent monomethylsiloxane and 9.1 mol percent diphenylsiloxane and containing 1.6% by weight silicon bonded hydroxy groups was mixed with 50 cc. of a fluid trimethylsilyl end-blocked ethyl hydrogen siloxane and 1 cc. of dibutyl-tin-dilaurate and thereafter heated at 120° C. A uniform foam was produced.

*Example 3*

300 g. of an essentially hydroxyl free methylphenylsiloxane resin was mixed with 5 cc. of a fluid trimethylsilyl end-blocked methyl hydrogen siloxane, 1 cc. of dibutyl-tin-dilaurate and 10 cc. of glycerol. Upon heating at 120° C. a uniform foam was produced. Equivalent results were obtained when the process was repeated employing 10 cc. each of the following compounds: ethylene glycol, water, ethanol, mixed fluid dimethylsiloxane diols, butanol, and isopropanol.

*Example 4*

The organosiloxane resin employed in this example was a mixture of 70% by weight of a substantially hydroxyl free copolymer of 29.4 mol percent phenylmethylsiloxane, 32 mol percent monomethylsiloxane, 32.6 mol percent monophenylsiloxane and 6 mol percent diphenylsiloxane and 30% by weight of a siloxane resin having the same composition except that it contained about 5% by weight silicon bonded hydroxyl groups.

100 parts by weight of this siloxane resin blend was mixed with 1 cc. of dibutyl-tin-dilaurate and with the amounts of a fluid trimethylsilyl end-blocked methyl hydrogen polysiloxane shown in the table below and thereafter heated at 150° C. The resulting foams in each case had the densities shown in the table.

| Parts by Weight Methyl Hydrogen Siloxane | Density of Foam in Lbs. per Cu. Ft. |
|---|---|
| 10 | 4.4 |
| 5 | 5.7 |
| 2 | 8.9 |

All of these foams had fine pore size and all were tougher and less friable than comparable polysiloxane foams prepared in accordance with the foresaid patent.

*Example 5*

The resin employed in this example was a silicone-alkyd resin which was the reaction product of 23.1% by weight ethylene glycol, 36.1% by weight dimethylisophthalate, 6.1% by weight maleic anhydride, 15.1% by weight of a partially hydrolyzed phenylvinyldiethoxysilane and 19.6% by weight of a partially hydrolyzed phenylmethyldimethoxysilane.

100 g. of this resin were mixed with 5 cc. of a fluid trimethylsilyl end-blocked methyl hydrogen polysiloxane and 1 cc. of a solution of 50% by weight dibutyl-tin-dilaurate and 50% by weight butanol. The resulting mixture was heated at 120° C. whereupon it gave a uniform foam.

*Example 6*

The procedure of Example 5 was repeated except that the resin employed was the reaction product of 21.6% by weight of trimethylolethane, 8.4% by weight ethylene glycol, 52.3% by weight dimethylterephthalate and 17.7% by weight of a partially hydrolyzed diphenyldimethoxysilane. A uniform foam was obtained.

*Example 7*

The procedure of Example 5 was repeated except that the resin employed was the reaction product of 288 g. of trimethylolethane, 158.8 g. of ethylene glycol, 194 g. of dimethylterephthalate and 224 g. of sorbic acid. A uniform foam was obtained.

*Example 8*

Foams are obtained when 300 g. of the following resins are each mixed with 15 cc. of fluid methyl hydrogen polysiloxane and 10 cc. of glycerine and thereafter heated at 150° C.: Phenol-formaldehyde, polystyrene, polyvinylchloride, polyisoprene and a copolymer of 35 mol percent styrene and 65 mol percent butadiene.

*Example 9*

A foam is obtained when 100 g. of a copolymer of 10 mol percent trifluorovinylsiloxane, 30 mol percent allylmethylsiloxane, 10 mol percent chlorophenylmethylsiloxane, 20 mol percent cyclohexylmethylsiloxane and 30 mol percent monomethylsiloxane, which copolymer contains 5% by weight silicon bonded OH groups, is mixed with 10 cc. of fluid methyl hydrogen polysiloxane and 1 cc. of lead octoate and thereafter heated at 120° C.

That which is claimed is:

1. A method of preparing a foam which comprises heating a mixture of (1) an organic resin, (2) from .05 to 50% by weight based on the weight of the resin of an organosiloxane in which at least a major portion of the siloxane units are of the formula $$R'_m H_a SiO_{\frac{4-m-a}{2}}$$

in which R' is selected from the group consisting of lower alkyl radicals and monocyclic aryl hydrocarbon radicals and $m$ and $a$ each have an average value from 1 to 2 inclusive, essentially all of the silicon atoms of any remaining siloxane units in (2) being substituted with organic radicals of the group consisting of monovalent hydrocarbon radicals and halogenated monovalent hydrocarbon radicals and (3) a hydroxylated compound, at a temperature sufficient to give a resin foam.

2. Method of preparing a siloxane foam which comprises heating a mixture of an organosilicon resin of the formula $$R_n SiO_{\frac{4-n}{2}}$$

where R is selected from the group consisting of monovalent hydrocarbon radicals and halogenated monovalent hydrocarbon radicals and $n$ has an average value from 1 to 2 inclusive, (2) from .05 to 50% by weight based on the weight of the resin of an organosiloxane in which at least a major portion of the siloxane units are of the formula $$R'_m H_a SiO_{\frac{4-m-a}{2}}$$

in which R' is selected from the group consisting of lower alkyl radicals and monocyclic aryl hydrocarbon radicals and $m$ and $a$ each have an average value from 1 to 2 inclusive, essentially all of the silicon atoms in any remaining siloxane units in (2) being substituted with organic radicals of the group consisting of monovalent hydrocarbon radicals and halogenated monovalent hydrocarbon radicals and (3) a hydroxylated compound, at a temperature sufficient to give a resin foam.

3. A method of preparing an organosiloxane foam which comprises heating a mixture of a hydroxylated organopolysiloxane resin of the formula $$R_n SiO_{\frac{4-n}{2}}$$

where R is selected from the group consisting of monovalent hydrocarbon radicals and halogenated monovalent hydrocarbon radicals and $n$ has an average value from 1 to 2 inclusive and (2) from .05 to 50% by weight based on the weight of the resin of an organosiloxane in which at least a major portion of the siloxane units are of the formula $$R'_m H_a SiO_{\frac{4-m-a}{2}}$$

in which R' is selected from the group consisting of lower alkyl radicals and monocyclic aryl hydrocarbon radicals and $m$ and $a$ each have an average value of from 1 to 2 inclusive, essentially all of the silicon atoms in any remaining siloxane units in (2) being substituted with organic radicals of the group consisting of monovalent hydrocarbon radicals and halogenated monovalent hydrocarbon radicals, at a temperature sufficient to give a resin foam.

4. A method of preparing a foam which comprises heating a mixture of (1) a hydroxylated organosilicon resin of the formula $$R_n SiO_{\frac{4-n}{2}}$$

where R is selected from the group consisting of monovalent hydrocarbon radicals and halogenated monovalent hydrocarbon radicals and $n$ has an average value of from 1 to 2 inclusive, (2) from .05 to 50% by weight based on the weight of the resin of an organosiloxane in which at least a major portion of the siloxane units are of the formula $$R'_m H_a SiO_{\frac{4-m-a}{2}}$$

in which R' is selected from the group consisting of lower alkyl radicals and monocyclic aryl hydrocarbon radicals and $m$ and $a$ each have an average value of from 1 to 2 inclusive, essentially all of the silicon atoms of any remaining siloxane units in (2) being substituted with organic radicals of the group consisting of monovalent hydrocarbon radicals and halogenated monovalent hydrocarbon radicals and (3) a hydroxylated compound, at a temperature sufficient to give a resin foam.

References Cited in the file of this patent

UNITED STATES PATENTS

| | | |
|---|---|---|
| 2,565,524 | Rust et al. | Aug. 28, 1951 |
| 2,582,228 | Brinkema | Jan. 15, 1952 |
| 2,757,423 | Wurtz et al. | Aug. 7, 1956 |

OTHER REFERENCES

Chem. Engineering, volume 59, No. 11, November 1952, page 204.

Dow-Corning Silicone Notes, September 15, 1951, page 4.